United States Patent
Rayfield et al.

(10) Patent No.: US 6,248,015 B1
(45) Date of Patent: Jun. 19, 2001

(54) TURRET SYSTEM ON A BUBBLE-UP AUGER FOR AN AGRICULTURAL COMBINE

(75) Inventors: James F. Rayfield; Gary L. Bich, both of New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/492,234

(22) Filed: Jan. 27, 2000

(51) Int. Cl.[7] .................................................. A01D 34/00
(52) U.S. Cl. .............................................. 460/131; 56/14.6
(58) Field of Search .................................. 414/526, 523, 414/502, 503, 519; 239/624, 625; 198/119, 213; 56/14.6; 460/111, 114, 131

(56) References Cited

U.S. PATENT DOCUMENTS

| | | |
|---|---|---|
| Re. 24,920 | 4/1958 | Palmer . |
| 2,481,860 | 11/1947 | Miller . |
| 2,885,129 | 3/1957 | Worrell . |
| 3,670,913 * | 6/1972 | Reaves .......................... 414/505 |
| 3,721,333 * | 6/1972 | Boone ........................... 198/119 |
| 3,834,564 * | 9/1974 | Laurent et al. ................ 414/523 |
| 3,940,911 * | 3/1976 | Schmitt ........................... 56/14.6 |
| 4,008,819 | 2/1977 | Hanaway ........................ 214/522 |
| 4,029,228 | 6/1977 | Shaver ........................... 214/522 |
| 4,093,087 * | 6/1978 | DeCoene ....................... 414/523 |
| 4,106,649 | 8/1978 | Nelson et al. .................. 214/522 |
| 4,428,182 * | 1/1984 | Allen et al. .................... 56/14.6 |
| 4,662,812 | 5/1987 | Busboom et al. .............. 414/523 |
| 5,516,253 * | 5/1996 | Llnscheid et al. .............. 414/519 |
| 5,695,398 | 12/1997 | Carlson et al. ................. 460/114 |
| 6,042,326 * | 6/1998 | Thomas et al. ................ 414/502 |

* cited by examiner

*Primary Examiner*—Robert E. Pezzuto
*Assistant Examiner*—Árpád F Kovács
(74) *Attorney, Agent, or Firm*—John William Stader; Larry W. Miller

(57) ABSTRACT

A rotating bubble-up auger of an agricultural combine harvester having a fixed, lower auger assembly receiving a grain from a clean grain elevator. The rotating upper auger assembly is connected by a roller assembly to the lower auger assembly. A handle controls movement of the upper auger assembly. The operator lifts a spring-biased pin upwards and can rotate the assembly manually. Another option allows for the use of an electric motor that drives a worm gear. The worm gear contacts a series of collar teeth on an upper auger collar positioned on the upper auger assembly.

6 Claims, 4 Drawing Sheets

TURRET SYSTEM ON A BUBBLE-UP AUGER FOR AN AGRICULTURAL COMBINE

BACKGROUND OF INVENTION

1. Field of Art

This invention relates to the improvement of the bubble-up auger on an agricultural combine. More specifically, the invention is a turret system for the bubble-up auger on a combine.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing, separation and cleaning areas of the combine. The grain is separated from the stalk by a rotor or cylinder threshing system. The grain is then separated and moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR® 99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866, 920, 4,907,402, 4,967,544 and 5,155,984. See also the New Holland corn head model 996 and the New Holland grain belt header model 994 for details regarding headers.

As previously alluded to, the processed grain enters the grain tank from the separating and cleaning system by means of a clean grain elevator. How the grain has been placed into the grain tank has gradually evolved driven by several factors. Originally, the clean grain entered the tank from the base of the tank. Of course as the pile of grain increased, the force needed to push more grain into the grain tank increased. This damaged the grain when the pile became too heavy. To alleviate this dilemma, a grain tank auger was introduced. Basically, the grain tank auger would lift and deposit the grain from the clean grain elevator to the top of the grain tank. The next improvement involved the creation of the bubble up auger. The bubble-up auger allowed for even more grain to be piled into the center of the grain tank. The bubble-up auger was typically spring biased or hydraulically driven and would constantly be rising above the pile of grain. However, grain tank sizes are increasing so much that a bubble up auger could rise quite high above the sides of the combine. This creates transport difficulties because the total height of the combine could increase to the point where the bubble-up auger would protrude above the combine contrary to various state and federal transport regulations.

The prior art illustrates these drawbacks. U.S. Pat. No. 4,008,819 illustrates a self-raising bin loading auger for combines or a conventional spring-biased bubble-up auger. U.S. Pat. No. 4,106,649 illustrates a floating grain bin extension for use with agricultural combine or a bubble-up auger for an even larger grain tank. U.S. Pat. No. Re 24,920 illustrates a grain bin unloading system. U.S. Pat. No. 2,885,129 illustrates a gearbox and transition region positioned at the base of the a grain auger. U.S. Pat. No. 4,029,228 illustrates another spring biased bubble-up auger. U.S. Pat. No. 5,695,398 illustrates a folding loading auger. This single grain-loading auger is hydraulically raised and then latched into position prior to operating. Once the grain tank is full, the auger remains in an upright position creating transport issues. U.S. Pat. No. 2,481,860 shows a spring biased grain tank unloading system. U.S. Pat. No. 4,662,812 shows a bin unloader with an oblique pivot axis.

A bubble-up auger for grain tank loading that had a turret system would be a great improvement to an agricultural combine.

OBJECTS OF THE INVENTION

It is an object of the present invention to provide a turret system on a bubble-up auger for use on an agricultural combine.

It is an object of the present invention to provide a grain tank auger capable of being pivoted to allow for easy transport.

It is an object of the present invention to provide a grain tank auger that allows for the attachment of a yield monitoring system.

It is an object of the present invention to provide a grain tank turret system that may be rotated by the operator in the combine cab.

It is an object of the present invention to provide a grain tank turret system that may be manually rotated.

It is an object of the present invention to provide a grain tank turret system that may be easy installed in an existing combine harvester.

SUMMARY OF THE INVENTION

The invention is an improvement to the bubble-up grain tank-loading auger on an agricultural combine. The invention consists of a fixed lower auger assembly. Rotationally attached to the lower auger assembly is the upper auger assembly. The upper auger assembly has an upper auger collar attached by a roller assembly to a lower auger collar on the lower auger assembly. The collars are oriented on an oblique plane relative to the auger assemblies. As the upper auger assembly is rotated, this allows the top of the auger to be positioned in a variety of locations with the grain tank. The motion of the upper auger assembly can be controlled by a handle attached to the upper auger collar and spring-biased pin inserted through the upper and lower auger collars. The operator raises pin and manually rotates the upper auger assembly into the appropriate position. The pin is then urged by the spring into position locking the upper assembly into position. An electric motor assembly may also rotate the upper auger assembly. A switch-controlled electric motor rotates a worm gear. The worm gear meshes with a series of collar teeth positioned on the periphery of the upper auger collar. The upper auger collar is rotated to the appropriate position as desired by controlling the switch.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
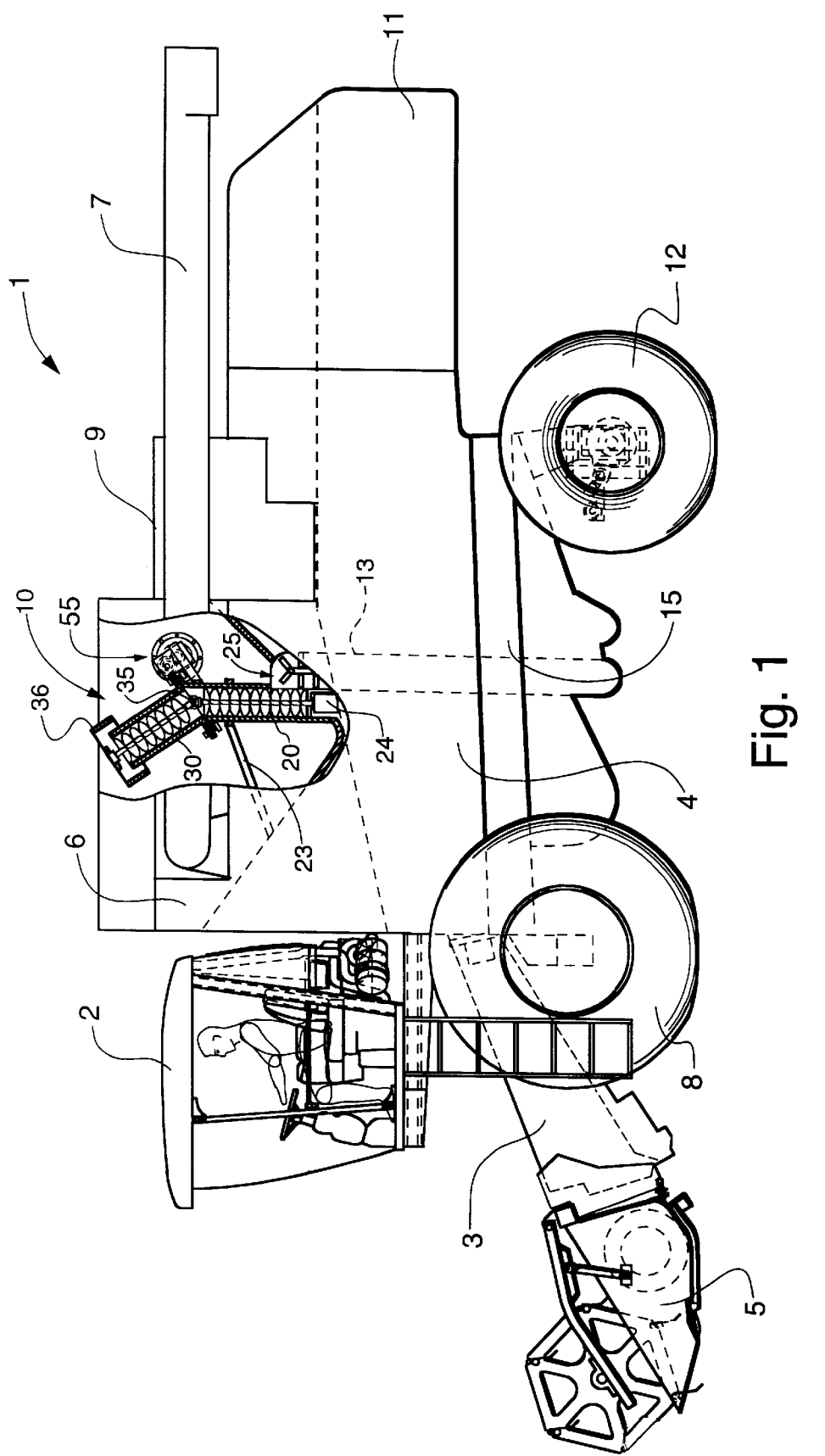
FIG. 1 is a schematic side elevational view of a combine with structure broken away to reveal the inside of the grain tank.
Figure 2:
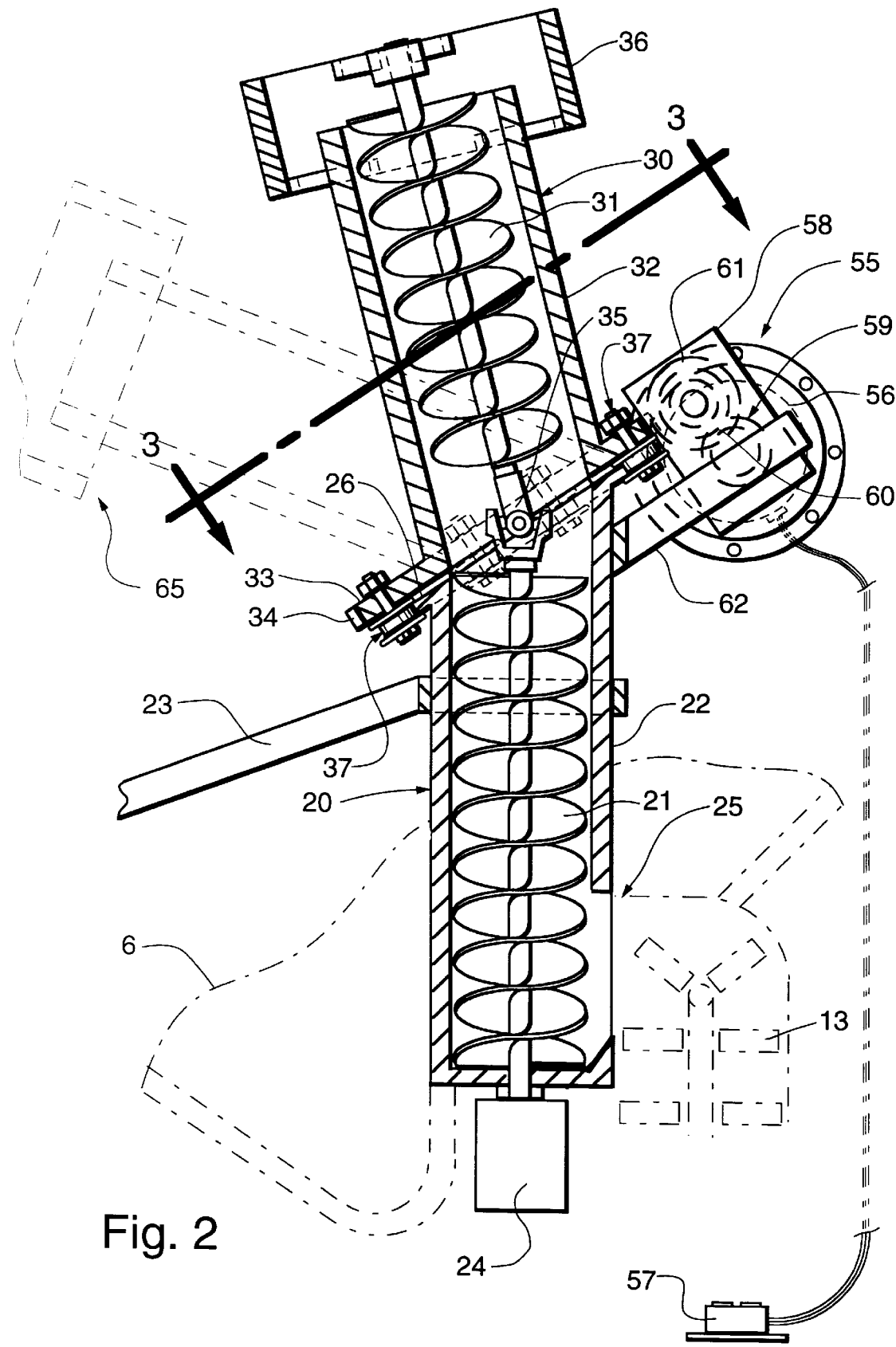
FIG. 2 is an enlarged vertical sectional view of the structure visible within the grain tank in FIG. 1.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. D defines the typical forward direction of travel. Upward or downward orientations are relative to the ground or operating surface. Horizontal or vertical planes are also relative to ground.

As seen in FIG. 1, the invention is located on a typical twin rotor combine 1 having a pair of front wheels 8 (only one shown) and a pair of rear wheels 12 (only one shown) for providing movement over the ground. At the front of the combine is a header 5 for cutting a crop. As the combine 1 and header 5 are moved forward, the header cuts the grain and stalk. The header moves the grain into an auger trough. A transverse auger pushes the grain and stalk in the auger trough to the center of the header. The header may be positioned and re-positioned relative to the ground. The header may also be tilted to the left or right or may be positioned relatively high or low to the ground. These features are constantly being adjusted depending on the terrain and crop conditions. Moveable headers are well known and established in the art. Located at the rear center of the header is the feederhouse 3 or elevator. The feederhouse 3 moves the grain and stalks rearward into the threshing, separation, cleaning and clean grain systems 4 of the combine 1. There are a variety of different threshing, separation, cleaning and clean grain systems 4 which are numerous and well known by those skilled in the art. After processing, separation and cleaning the grain transported by a clean grain elevator 13 upwards and dumped into the clean grain transition 25. The turret system and present invention 10 lifts the clean grain from the clean grain transition 25 and deposits the grain at the top of the grain tank 6 located near the top of the combine 1. The grain is transferred from the grain tank 6 to a transport vehicle by an unload auger tube 7. Usually during the harvesting operations, the unloading auger remains un-driven and the grain tank unload auger tube 7 remains retracted as shown in FIG. 1. However, the combine can be unloaded 'on the go'. A separate vehicle such as a truck or tractor-pulled grain cart drives beside the moving combine. The processed grain is discharged while the combine and receiving vehicle are moving. The trash or chaff is ejected from the rear of the combine by a chaff spreader 11. The operator controls the combine 1 from the cab 2 located behind the header and at the front of the combine. From the cab 2 the operator can observe most of the various combine functions. The cab 2 usually has a large glass window or several windows which afford the operator the maximum ability to monitor the header. The combine 1 and various systems are powered by an engine 9 generally positioned at the rear of the combine 1. Most of the major systems in a combine are discussed and well known in the prior art.

As previously indicated, the present invention is the turret system on the combine's bubble-up auger. It consists of lower auger assembly 20 and rotationally attached upper auger assembly 30. The upper auger assembly 30 can be rotated relative to the lower assembly 10 by means of either a handle 50 or an electric motor assembly 55 to or from a transport position 65.

Figure 3:
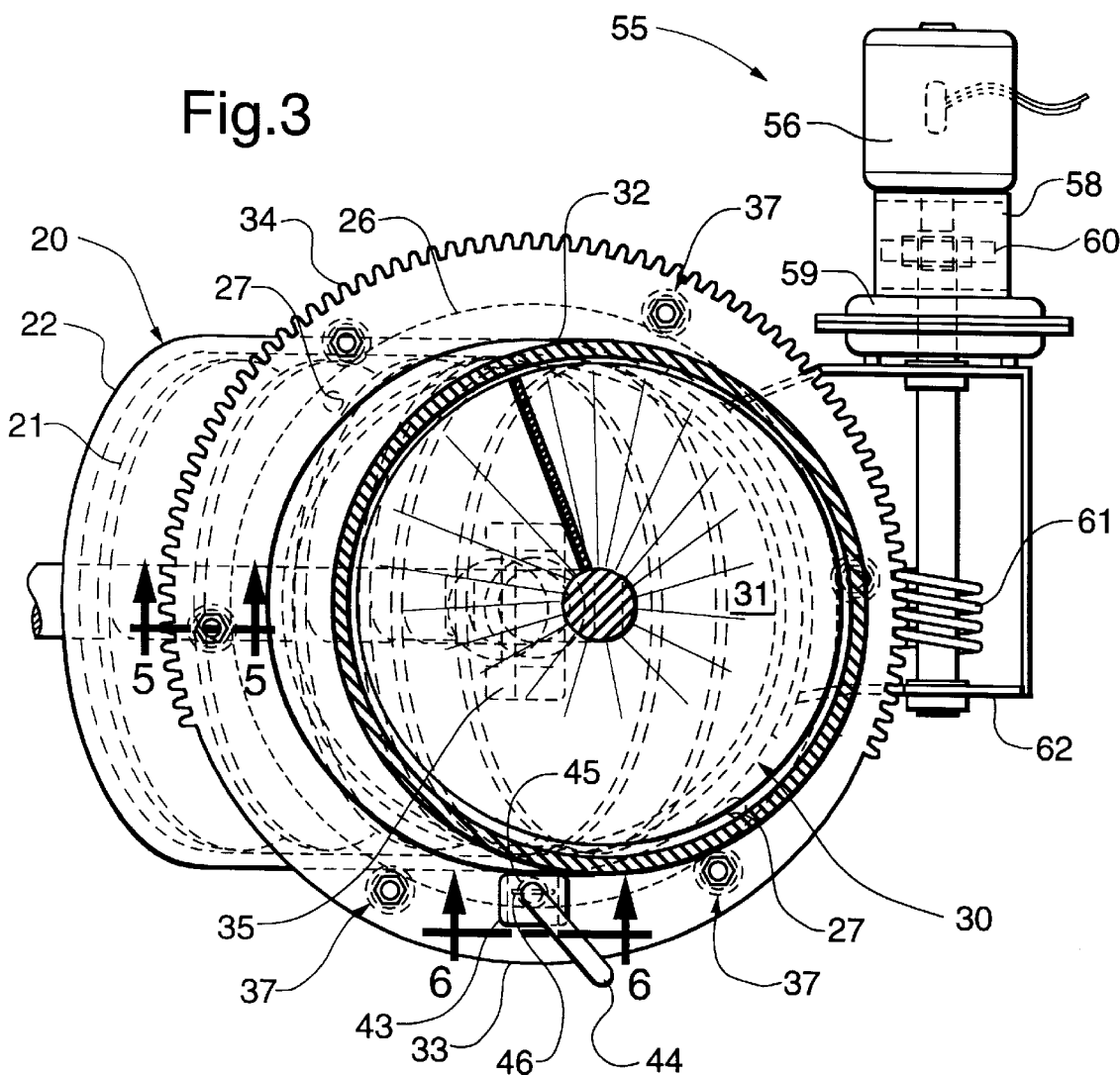
FIG. 3 is a sectional view perpendicular to the auger collars showing the electric motor assembly taken on line 3—3 of FIG. 2.
Figure 4:
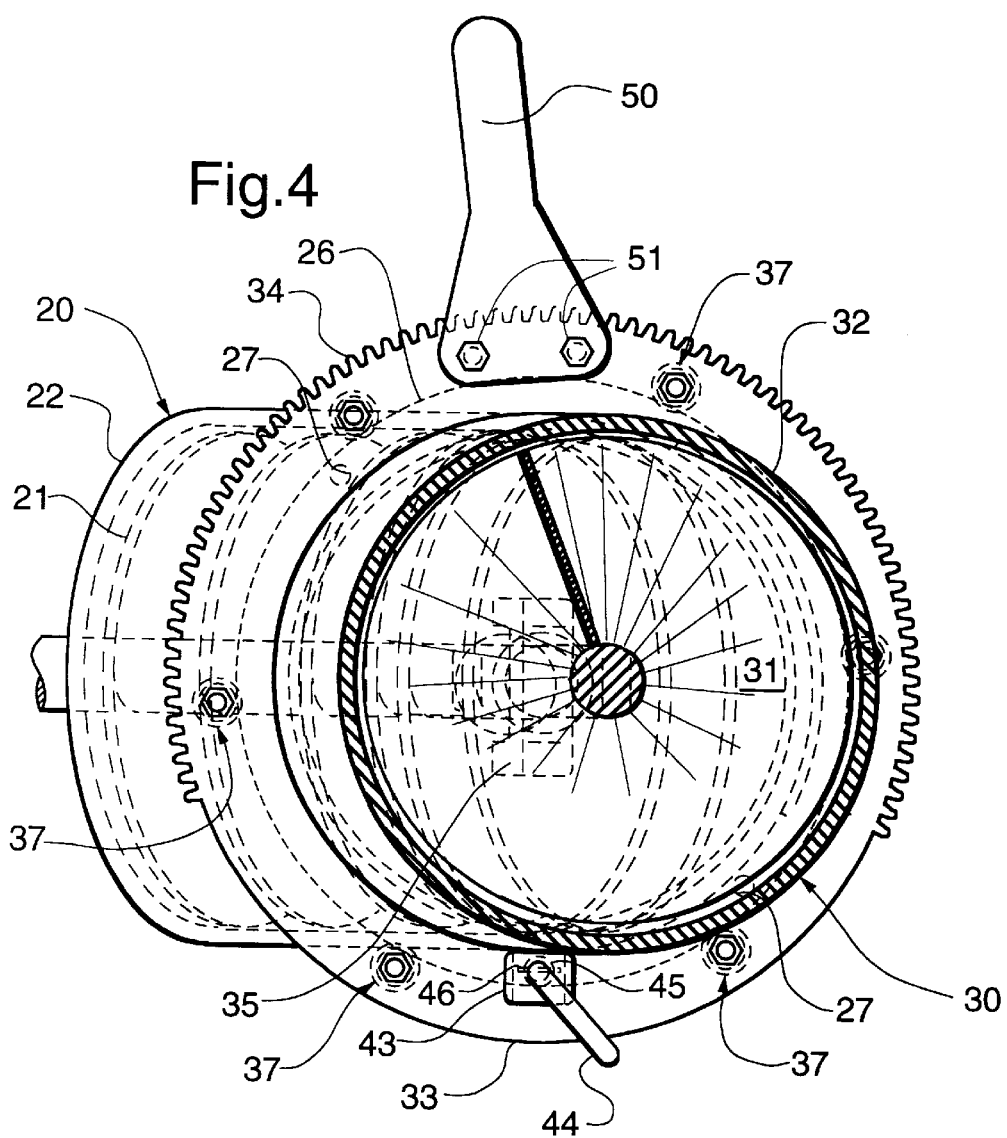
FIG. 4 is a view similar to FIG. 3, but showing the manual turning means embodiment.
Figure 6:
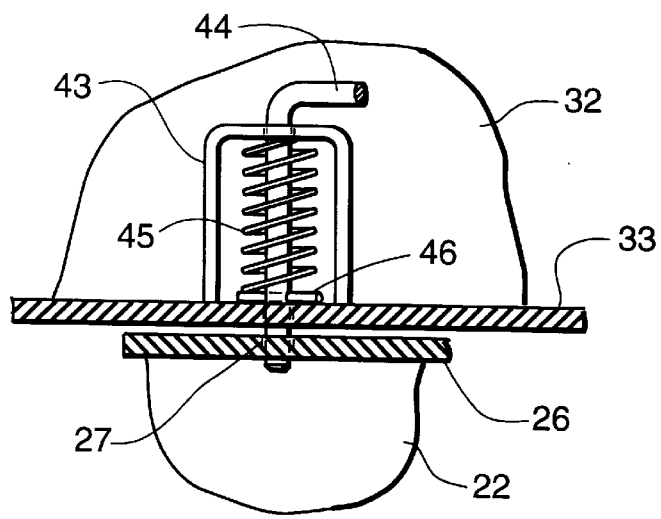
FIG. 6 is a detailed sectional view of the pin and pin bracket taken on the line 6—6 of FIG. 3 and drawn to a larger scale.

The lower auger assembly 20 has lower auger shielding 22. Within the shielding 22 is the lower auger flighting 21. A lower auger gearbox 24 rotates the lower auger flighting 21. Typically grain exits at the top of the clean grain elevator 13, slides down the clean grain transition 25 and is lifted by the lower auger flighting 21. Attached to the lower auger shielding 22 is the lower auger collar 26. The collar 26 is oriented on an oblique plane relative to the axis of the cylindrically shaped auger shielding 22. The oblique plane intersects the auger shielding axis at a non-perpendicular angle. The collar 26 also has two diametrically opposed pin holes 27 (see FIGS. 3 and 4). The lower auger assembly 20 is held in a fixed position a brace 23.

The upper auger assembly 30 has upper auger shielding 32 and upper auger flighting 31. The lower auger flighting 21 and upper auger flight 31 are corrected by a splined universal or U joint 35 to allow for movement and mis-alignment. Attached to the upper auger shielding 32 is the upper auger collar 33. On the periphery of the upper auger collar 33 is a series of the collar teeth 34. As like the lower auger collar 26, the upper auger collar 33 is oriented on an oblique plane relative to the shielding. On the surface of the collar 33 is the pin bracket 43. Attached at the top of the upper auger shielding 32 is the deflector 36.

Figure 5:
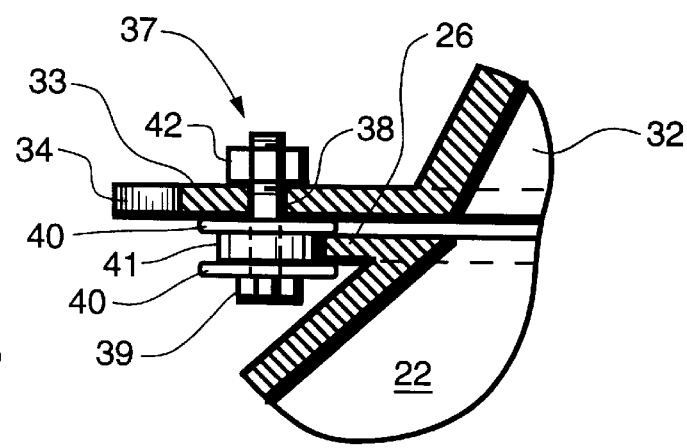
FIG. 5 is a detailed sectional view of the roller assembly taken on the line 5—5 of FIG. 3 and shown in larger scale.

The lower auger collar 26 and upper auger collar 33 are connected by a roller assembly 37 attached to the upper auger collar 33. The roller assembly 37 consists of a bolt 39 and several washers inserted through a roller hole 38 on the upper auger collar 33 (see detail FIG. 5). The roller 41 is held on the bolt by a nut 42. The roller 41 contacts and moves over the periphery of the lower auger collar 33. The nut 42 extends beneath the same periphery of the lower auger collar 36 to ensure alignment between the upper 33 and lower 26 auger collars.

To rotate the upper auger assembly 30 relative to the fixed lower assembly 20, there are several possible mechanisms. The least complex and primary embodiment uses a handle 50 affixed by a handle bolt 51 to the upper auger collar 33. The operator pulls a pin 44 in the pin bracket 43 away from a pin hole 27 in the lower auger collar 26. Typically the pin 44 is biased by a spring 45 and spring pin 46 into a locked position. Once the pin 44 is removed from the pin hole 27, the operator is free to rotate the upper auger assembly 30 into any desirable position. There are at least two pin holes 27 in the lower auger collar 26 to facilitate proper alignment. In the present embodiment, the holes 27 are diametrically opposed to allow movement of the upper auger assembly 30 from an operating position to the transport position. The pin bracket 43 on the upper auger collar 33 and the pin holes 27 on the lower auger collar 26 typically will always be present because this lowers manufacturing costs and allows for emergency rotation of the upper auger assembly 30 in the event that the other rotation methods fail.

Another means for rotating the upper auger assembly 30 involves the use of an electric motor assembly 55. Basically, the electric motor drives the worm gear 61 that contacts the collar teeth 34 allowing for the upper auger assembly 30 to rotate. An electric motor 56 is controlled by a switch 57 positioned in the cab 2. A motor bracket 58 supports the electric motor 56. The motor 56 rotates a motor drive 59. The motion of the drive 59 is properly adjusted by a series of reduction gears 60. The reduction gear 60 drives the worm gear 61. The worm gear 61 meshes with the collar teeth 34 on the periphery of the upper auger collar 33. A worm gear support bracket 62 supports the worm gear 61. It is understood that a battery or common electric source powers the electric motor.

Because of the oblique angle of the upper collar 33 and lower auger collar 26, when the upper collar 33 rotates, the deflector end of the upper auger assembly 30 may be positioned to suit a variety of situations. During typical harvesting operations, it is desirable to position the top or deflector end of the upper auger assembly 30 over the center of the grain tank 6. While the harvester is being transported, the upper auger assembly 30 can be positioned to a transport position so that its axis is parallel to the horizon. Also because the lower auger assembly 20 remains fixed, the yield monitoring equipment available in many harvesters can be affixed to the lower auger shielding 22 without risk of movement impacting its calculations.

It will be obvious to those skilled in the art that various changes may be made without departing from the scope of the invention and the invention is not to be considered limited to what is illustrated in the drawings and described in the specification.

What is claimed is:

1. A turret system for a bubble-up auger on an agricultural combine comprising:
    a. a lower auger assembly for receiving a quantity of grain from a clean grain elevator having a lower auger collar,
        i. a lower auger flighting connected to a lower auger gearbox, said lower auger flighting receiving the quantity of grain from the clean grain elevator through a clean grain transition; and
        ii. a lower auger shielding surrounding the lower auger flighting, the lower auger collar attached to the lower auger shielding;
    b. an upper auger assembly for receiving the quantity of grain and charging said grain into a grain tank, the upper auger assembly being capable of rotating relative to the lower auger assembly, the upper auger assembly having an upper auger collar, the upper auger collar proximate to the lower auger collar, wherein said upper auger collar is oriented in an oblique plane relative to the upper auger shielding, and further comprises a plurality of gear teeth positioned on a periphery of the upper auger collar and a pin bracket;
    c. a roller assembly attached to the upper auger collar, allowing the upper auger assembly to rotate relative to the lower auger assembly; and
    d. a means for rotating the upper auger assembly further comprising,
        i. a worm gear in rotational contact with the collar teeth; and
        ii. a means for rotating the worm gear, wherein said means for rotating the worm gear further comprises a motor bracket housing an electric motor, a switch electrically connected to the motor and a reduction gear operably connected to the motor and the worm gear.

2. The turret system described in claim 1, wherein the worm further comprises a worm gear support bracket.

3. In a self-propelled combine harvester, said combine having an engine, a cab and shielding, said combine having a header, said header operationally connected to a threshing and separating system by a feederhouse, said threshing and separating system, said system is operationally connected to a grain tank by a clean grain elevator, said grain tank operationally connected to a unload auger tube, said combine having a forward direction of travel, said combine having a bubble-up auger for transporting a quantity of grain exiting the clean grain elevator to the grain tank, said bubble up auger further comprising:
    a. a clean grain transition attached to a lower auger assembly, said lower auger assembly further comprising:
        i. a lower auger shielding surrounding a lower auger flighting
        ii. a lower auger collar affixed to the lower auger shielding, the collar having a pin hole therein;
        iii. a brace for supporting the lower auger shielding, the brace attached to the grain tank;
    b. an upper auger assembly further comprising:
        i. an upper auger shielding surrounding an upper auger flighting, said upper auger flighting pivotally attached to the lower auger flighting by a U joint;
        ii. an upper auger collar having a plurality of collar teeth and a pin bracket;
        iii. a roller assembly rotationally connecting the upper auger shielding to the lower auger shielding; and
    c. a means for rotating upper auger assembly relative to the lower auger assembly, wherein the means for rotating the upper auger assembly further comprises:
        i. a worm gear in rotational contact with the collar teeth; and
        ii. a motor bracket housing an electric motor;
        iii. a switch electrically connected to the motor;
        iv. a reduction gear operably connected to the motor and the worm; and
        v. a worm gear support bracket supports the worm gear.

4. The improvement in claim 3, wherein said lower auger collar is oriented in an oblique plane relative to the lower auger shielding.

5. The improvement in claim 4, wherein said plurality of gear teeth are positioned on the periphery of the upper auger collar.

6. The improvement in claim 3, wherein the roller assembly further comprises:
    a. a bolt affixed to the upper auger collar; and
    b. a roller rotationally attached to the bolt and secured by a nut, the roller is in slideable contact with the lower auger collar.

* * * * *